Patented Dec. 6, 1932

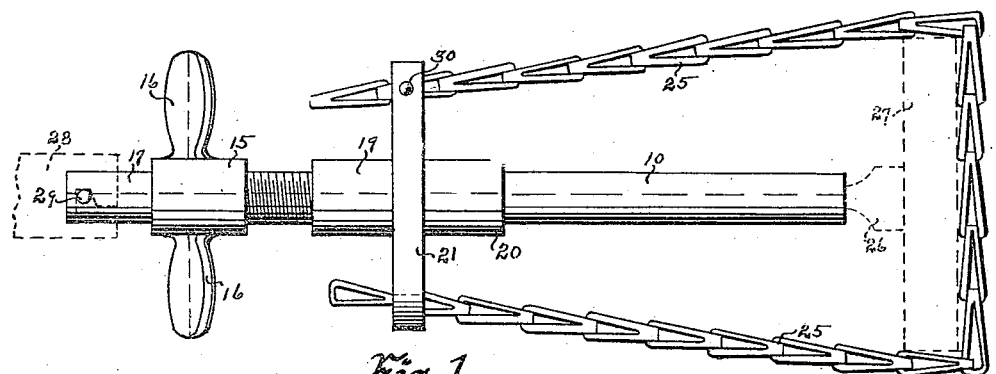
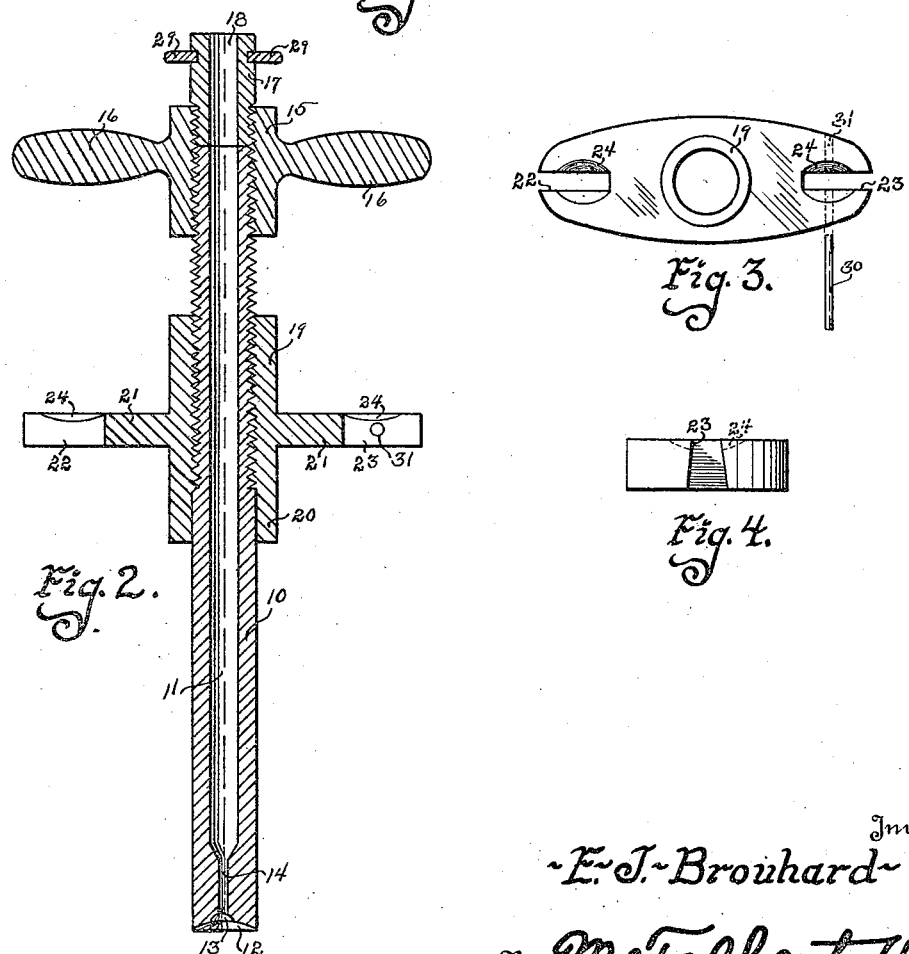

1,889,971

UNITED STATES PATENT OFFICE

EDWARD J. BROUHARD, OF DES MOINES, IOWA

ATTACHABLE ADAPTER FOR USE IN CONNECTION WITH GREASE GUNS

Application filed September 14, 1928. Serial No. 306,047.

The principal object of this invention is to provide an adapter for use in connection with grease guns that is easily attached or detached to any grease nipple that is not provided with means for the securing of a grease gun to the same.

A further object of this invention is to provide an adapter for use in connection with grease guns that may be so securely attached to a grease nipple that it is capable of great hydraulic pressure without any leakage of the grease or oil being forced into the nipple.

A still further object of this invention is to provide an attachable adapter for use in connection with grease guns that when once attached allows the operator the use of both hands for the manipulation of the grease gun.

A still further object of this invention is to provide an attachable adapter for use in connection with grease guns when no attaching means is provided on the grease nipple to be oiled that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side view of my complete invention ready for use, with dotted lines illustrating the grease nipple to be serviced and the position of the same relative to the position of the device. A portion of the end of the grease gun secured to my invention is also shown by dotted lines.

Fig. 2 is a side sectional view of my invention and more fully illustrates its interior construction.

Fig. 3 is a top plan view of the chain engaging portion of the device.

Fig. 4 is an end view of the chain engaging portion of my invention and more fully illustrates the construction of one of the slots capable of receiving one end of the chain.

Many of the cars being placed on the market today are provided with grease valve nipples incapable of rigid attachment with high pressure lubricators or grease guns. In other words, with this type of nipple the grease gun must be manually held on the nipple, which is not of sufficient strength to prevent leakage of grease between the nipple and the grease gun. When such a condition exists pressure high enough to force oil or grease into frozen or clogged shackle bolts, tie rods and the like is absolutely impossible.

I have overcome these disadvantages by providing an adapter for use in connection with high pressure lubricators that may be easily and rigidly secured to any grease valve nipple.

I have designated the main stem portion of my device by the numeral 10 having the enlarged bore 11. In the forward end of this stem 10 is the large shallow depression 12. Near the center of this depression 12 is a second depression of much less diameter than the diameter of the depression 12 and which I have designated by the numeral 13. Communicating with the large bore 11 and the depression 13 is a passageway 14 of much less diameter than the diameter of the bore 11.

Threaded on the rear end of the stem 10 is the nut 15 having the handle members 16 integrally formed on the same and projecting laterally therefrom.

It will be noted from Fig. 2 that the nut 15 is only partially threaded on to the stem 10 thereby making it possible for the short stem member 17 to be threaded into the top of the nut 15 until it engages the upper marginal edge of the stem 10, consequently, so binding the nut 15 on the members 17 and 10 that independent rotation will be impossible. The numeral 18 designates a bore in the stem 17 having one end communicating with the outside atmosphere and its other end communicating with the bore 11. Threaded on the stem 10 and forward of the nut 15 is an elongated nut 19. Integrally formed on the forward end of this nut 19 is a guide collar 20 embracing the stem 10, for making the complete device more rigid when in use. The numeral 21 designates a peripheral flange integrally formed on the nut 19, as shown in the drawing. Diametrically opposite from each other and formed in the flange 21 are the two longitudinal slots 22 and 23, each having a greater width at the forward side of the flange 21 than they have at the rear side of the flange. Formed on the rear side of the flange 21 and adjacent each of the slots 22 and 23 is a depression 24, as shown in Fig. 3. The numeral 25 designates a link chain designed to have its two end portions entering and engaging the two slots 22 and 23 respectively, as shown in Fig. 1. As the slots are much smaller in width than the width of each engaging portion of each link of the chain, the chain can not be drawn through the slots but may easily be removed from the slots by sliding the same laterally out of the slots.

To operate the device it is merely necessary to place the forward end of the stem 10 over the grease nipple 26, place one end of the chain 25 in one of the slots, pass the chain around some base member such as 27 adjacent the nipple 26 and place the other end of the chain in the opposite slot of the flange 21, as illustrated in Fig. 1. By manually turning the nut 15, the nut 19 carrying the two ends of the chain 25 will be moved to the rear, thereby tightening the chain and securely holding the forward end of the stem 10 on to the grease nipple 26. The end of the grease gun which I have designated by the numeral 28 is then placed on the short stem 17 and rotated so that it will engage the lugs 29 on the short stem 17 in the usual manner. The grease gun then may be operated and any pressure that is developed by the same will force the grease or oil through the short stem 17 and stem 10 into and through the grease nipple 26 with ease and without leakage of the grease between the forward end of the adapter and the grease nipple. It will be found that on all cars there is some sort of base member 27 adjacent the grease nipple 26 which may be easily embraced by the chain 25. To remove the adapter from engagement with the grease nipple 26 it is merely necessary to rotate the nut 15 which in turn rotates the stem 10 to the left, thereby loosening the chain 25 to such an extent that it may easily be pulled out of engagement with the depressions 24 and slid laterally out of the slots 22 and 23. By this construction it will readily be seen that as a matter of fact it is only necessary to remove one end of the chain from one of the slots to remove the device and as this is so and to prevent the chain from being lost from the adapter when not in use, a pin 31 may be driven in the hole 31 and through one of the links of the chain 25 that is in the notch 23. The chain 25 may be of any length but when the device is placed on the nipple all slack possible should be taken up by using as short a length as possible.

When the adapter is tightened up on the nipple 26 the depressions 24 will prevent the chain from accidently becoming detached from the slots 22 and 23. By the slots 22 and 23 being of greater width at their forward ends than at their rear ends there is no danger of the chain 25 becoming wedged in the same, thereby hampering the ready removal of the chain from the slots.

Some changes may be made in the construction and arrangement of my improved attachable adapter for use in connection with grease guns without departing from the real spirit and purpose of my invention and it is my intention to cover by my claims any modified forms of structure or use of mechanical equivalents which may be reasonably included within their scope.

I claim:

1. A device for lubricating a spring shackle or the like having a contact type lubricant receiving nipple comprising a member, an adapter secured to said member, means for attaching the device to said shackle, said adapter having a nozzle adapted to engage said nipple and an inlet end to which a lubricant dispenser may be attached, and a passageway establishing communication between the inlet end and said nozzle.

2. A device for lubricating a spring shackle bolt or the like provided with a contact type lubricant receiving fitting, comprising a member provided with a passageway therethrough and having a socket at one end adapted to engage said fitting, a coupling fitting attached to the other end of the passageway for affixing a lubricant dispenser and means for attaching the device to said shackle bolt.

3. A device for lubricating a spring shackle bolt or the like provided with a contact type lubricant receiving fitting, comprising a member provided with a passageway therethrough and having a socket at one end adapted to engage said fitting, a coupling fitting attached to the other end of the passageway for affixing a lubricant dispenser, means for attaching the device to said shackle bolt, and means for adjusting the said attaching means.

EDWARD J. BROUHARD.